United States Patent
Chi

(12) 
(10) Patent No.: US 8,888,196 B2
(45) Date of Patent: Nov. 18, 2014

(54) FIELD SPOKE REPAIR KIT

(76) Inventor: Charlie W. Chi, San Francisco, CA (US)

( * ) Notice: Subject to any disclaimer, the term of this patent is extended or adjusted under 35 U.S.C. 154(b) by 921 days.

(21) Appl. No.: 12/953,012

(22) Filed: Nov. 23, 2010

(65) Prior Publication Data

US 2012/0126608 A1 May 24, 2012

(51) Int. Cl.
| B60B 25/00 | (2006.01) |
| F16B 7/18 | (2006.01) |
| B60B 1/02 | (2006.01) |
| F16B 35/00 | (2006.01) |

(52) U.S. Cl.
CPC . *B60B 1/02* (2013.01); *F16B 7/185* (2013.01); *B60B 2900/541* (2013.01); *F16B 35/005* (2013.01)
USPC ................................ 301/104; 301/58; 301/59

(58) Field of Classification Search
USPC ................... 301/55, 58–61, 70, 104
See application file for complete search history.

(56) References Cited

U.S. PATENT DOCUMENTS

| 436,993 | A | * | 9/1890 | Overman | 301/104 |
| 456,218 | A | * | 7/1891 | Goodrich | 301/55 |
| 910,001 | A | * | 1/1909 | Jenkinson | 301/104 |
| 1,280,646 | A | * | 10/1918 | Billhartz | 301/58 |
| 1,350,528 | A | * | 8/1920 | Stoute et al. | 301/104 |
| 1,392,545 | A | * | 10/1921 | Williams | 301/104 |
| 1,403,790 | A | * | 1/1922 | Krabill | 301/104 |
| 1,456,449 | A | * | 5/1923 | Johnson | 301/70 |

* cited by examiner

*Primary Examiner* — Jason Bellinger
(74) *Attorney, Agent, or Firm* — Dorsey & Whitney LLP

(57) ABSTRACT

Disclosed herein is a bicycle wheel repair kit for joining a first segment of a spoke to a second segment of the spoke, the first segment extending radially outward from a wheel hub to terminate in a first free end and the second segment extending radially inward from a wheel rim to terminate in a second free end. The kit may include a coupler including a first engagement member and a second engagement member. The first engagement member is configured to engage the first free end. The second engagement member is generally opposite the first engagement member and configured to engage the second free end. The coupler is configured such that a distance between the first engagement member and the second engagement member can be adjusted.

33 Claims, 14 Drawing Sheets

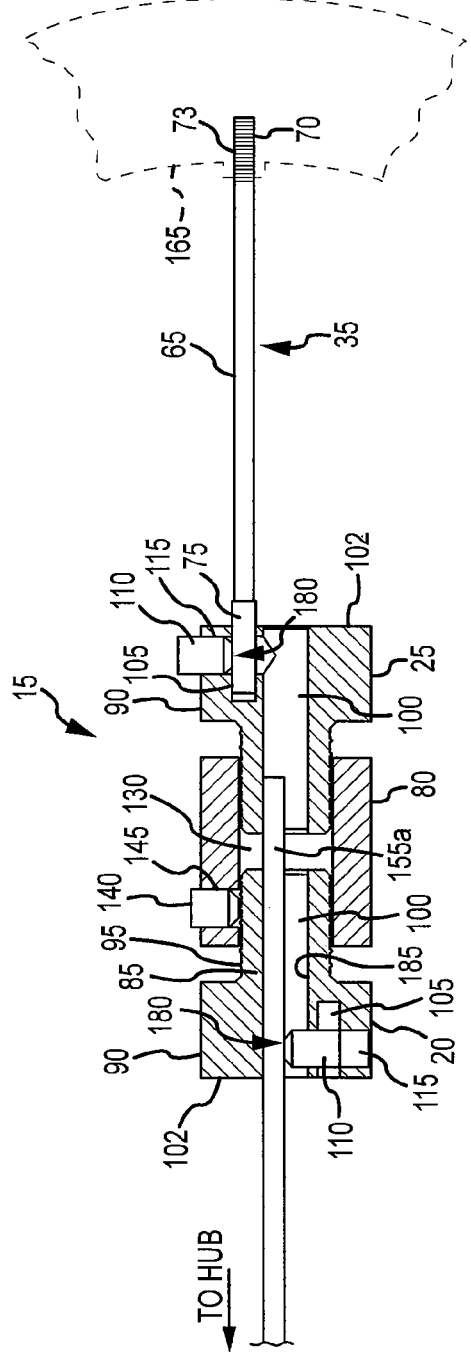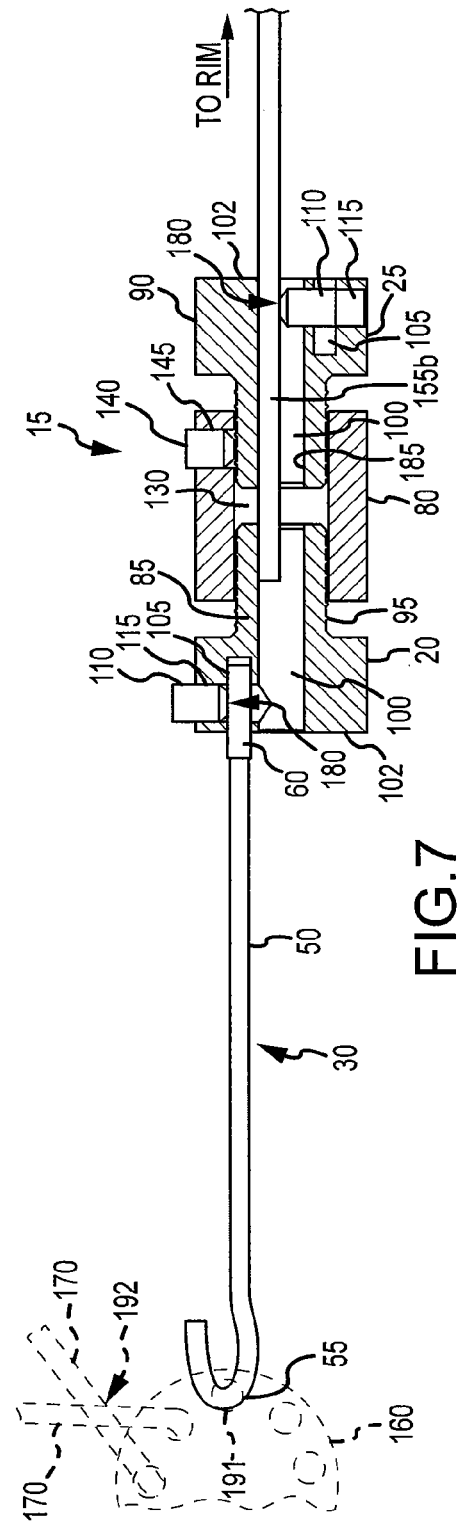
FIG.6
FIG.7

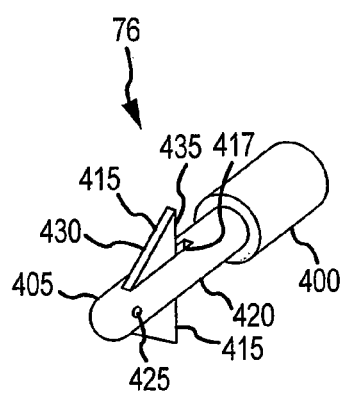
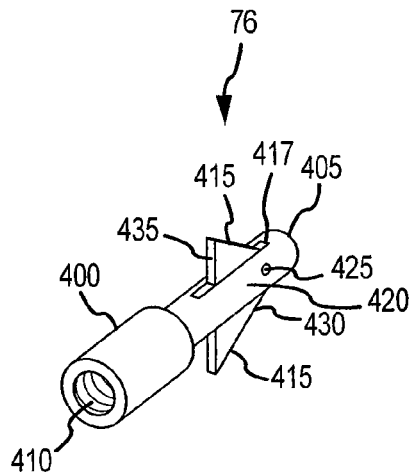
FIG.18   FIG.19
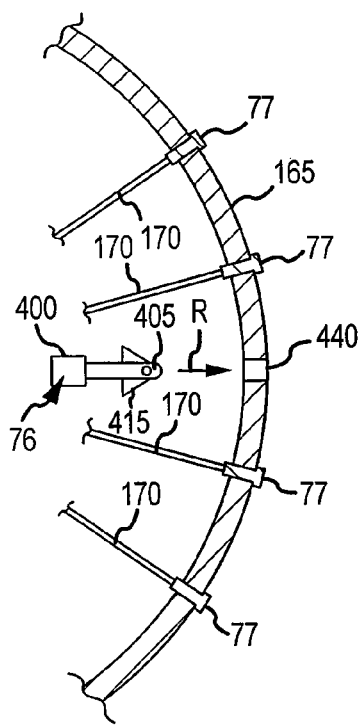
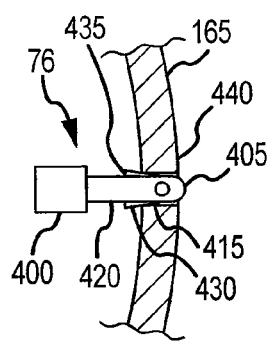
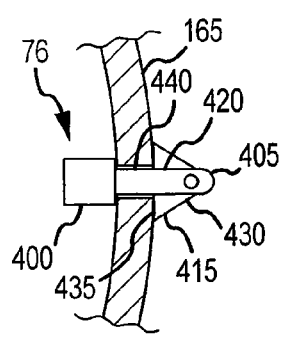
FIG.21   FIG.22
FIG.20

FIELD SPOKE REPAIR KIT

FIELD OF THE INVENTION

The present invention relates to bicycle equipment and accessories. More specifically, the present invention relates to kits for repairing broken bicycle wheel spokes.

BACKGROUND OF THE INVENTION

Up until the early 1980s, bicycle wheels had high spoke counts of, for example, 32 spokes for a front wheel and 40 spokes for a rear wheel. Such high spoke counts provided close spoke spacing. As a result, the failure of one or two spokes did not result in the bicycle wheel wobbling or becoming unridable.

After the early 1980s, bicycle wheels with lower spoke-counts were marketed as being an upgraded or high performance bicycle wheel. Bicycle wheels with low spokes, for example, 28, 24 or even 16 spokes, result in higher spoke tension and larger spoke spacing. As a result, when a single spoke breaks on a low spoke-count bicycle wheel, the wheel instantly goes out of alignment due to uneven tension and becomes unridable.

Avid bicyclists train with high performance bicycles that have the low spoke-count wheels. Such bicyclists ride long distances in a single training session and often in locations remote from assistance. Thus, a spoke failure can result in a bicyclist being stranded or having to walk the bicycle a long distance.

There is a need in the art for a kit and device for making a field or emergency repair to a failed spoke of a bicycle wheel. There is also a need in the art for method of making such a repair.

BRIEF SUMMARY OF THE INVENTION

Disclosed herein is a bicycle wheel repair kit for joining a first segment of a spoke to a second segment of the spoke, the first segment extending radially outward from a wheel hub to terminate in a first free end and the second segment extending radially inward from a wheel rim to terminate in a second free end. In one embodiment, the kit includes a coupler including a first engagement member and a second engagement member. The first engagement member is configured to engage the first free end. The second engagement member is generally opposite the first engagement member and configured to engage the second free end. The coupler is configured such that a distance between the first engagement member and the second engagement member can be adjusted.

Also disclosed herein is a repaired bicycle wheel. In one embodiment, the wheel includes a hub, a rim, a spoke and a spoke repair assembly. The rim is offset from and circumferentially extends about the hub. The spoke includes a first segment and a second segment. The first segment extends radially outward from the hub to terminate in a first free end. The second segment extends radially inward from the rim to terminate in a second free end. The spoke repair assembly includes a first member, a second member and an intermediate member. The first member engages the first free end. The second member engages the second free end. The intermediate member joins the first member to the second member to create a joined spoke assembly including the first segment, spoke repair assembly and second segment. The intermediate member is adjustable relative to the first member and the second member so as to adjust tension in the joined spoke assembly.

Also disclosed herein is a method of repairing a bicycle wheel. In one embodiment, the method includes: providing a bicycle wheel having a hub, a rim offset from and circumferentially extending about the hub, and a broken spoke including: a first segment extending radially outward from the hub to terminate in a first free end; and a second segment extending radially inward from the rim to terminate in a second free end; connecting a first engagement member to the first free end; connecting the second engagement member to the second free end; operably coupling the first engagement member to the second engagement member; and causing a decrease in distance between the first engagement member and the second engagement member, the decrease in distance resulting in an increase in tension in the first segment and the second segment.

Also disclosed herein is a method of repairing a bicycle wheel. In one embodiment, the method includes: provide a bicycle wheel comprising a hub, a rim offset from and circumferentially extending about the hub, and a broken spoke comprising: a first segment extending radially outward from the hub to terminate in a first free end; and a second segment extending radially inward from the rim to terminate in a second free end; provide an adapter hub spoke comprising a first end and a second end opposite the first end; operably couple the first end of the adapter hub spoke to the hub; connect a first spoke engagement member to the second end of the adapter hub spoke; connect a second spoke engagement member to the second free end; operably couple the first spoke engagement member to the second spoke engagement member via an intermediate member; and displace at least a portion of the intermediate member to bring about a reduction in distance between the first spoke engagement member and the second spoke engagement member.

Also disclosed herein is a method of repairing a bicycle wheel. In one embodiment, the method includes: provide a bicycle wheel comprising a hub, a rim offset from and circumferentially extending about the hub, and a broken spoke comprising: a first segment extending radially outward from the hub to terminate in a first free end; and a second segment extending radially inward from the rim to terminate in a second free end; provide an adapter rim spoke comprising a first end and a second end opposite the first end; operably couple the first end of the adapter rim spoke to the rim; connect a first spoke engagement member to the second end of the adapter rim spoke; connect a second spoke engagement member to the first free end; operably couple the first spoke engagement member to the second spoke engagement member via an intermediate member; and displace at least a portion of the intermediate member to bring about a reduction in distance between the first spoke engagement member and the second spoke engagement member.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 6 is the same view as FIG. 4, except employing the adapter rim spoke.

FIG. 7 is the same view as FIG. 4, except employing the adapter hub spoke.

FIGS. 18 and 19 are oppositely oriented isometric views of one embodiment of the replacement universal spoke nipple sown in FIG. 1.

FIGS. 20-22 are a series of cross sections through the wheel rim illustrating the replacement universal spoke nipple being installed in a hole in the rim formerly occupied by a spoke nipple that has failed or had a spoke fail in the spoke nipple.

DETAILED DESCRIPTION

Figure 1:
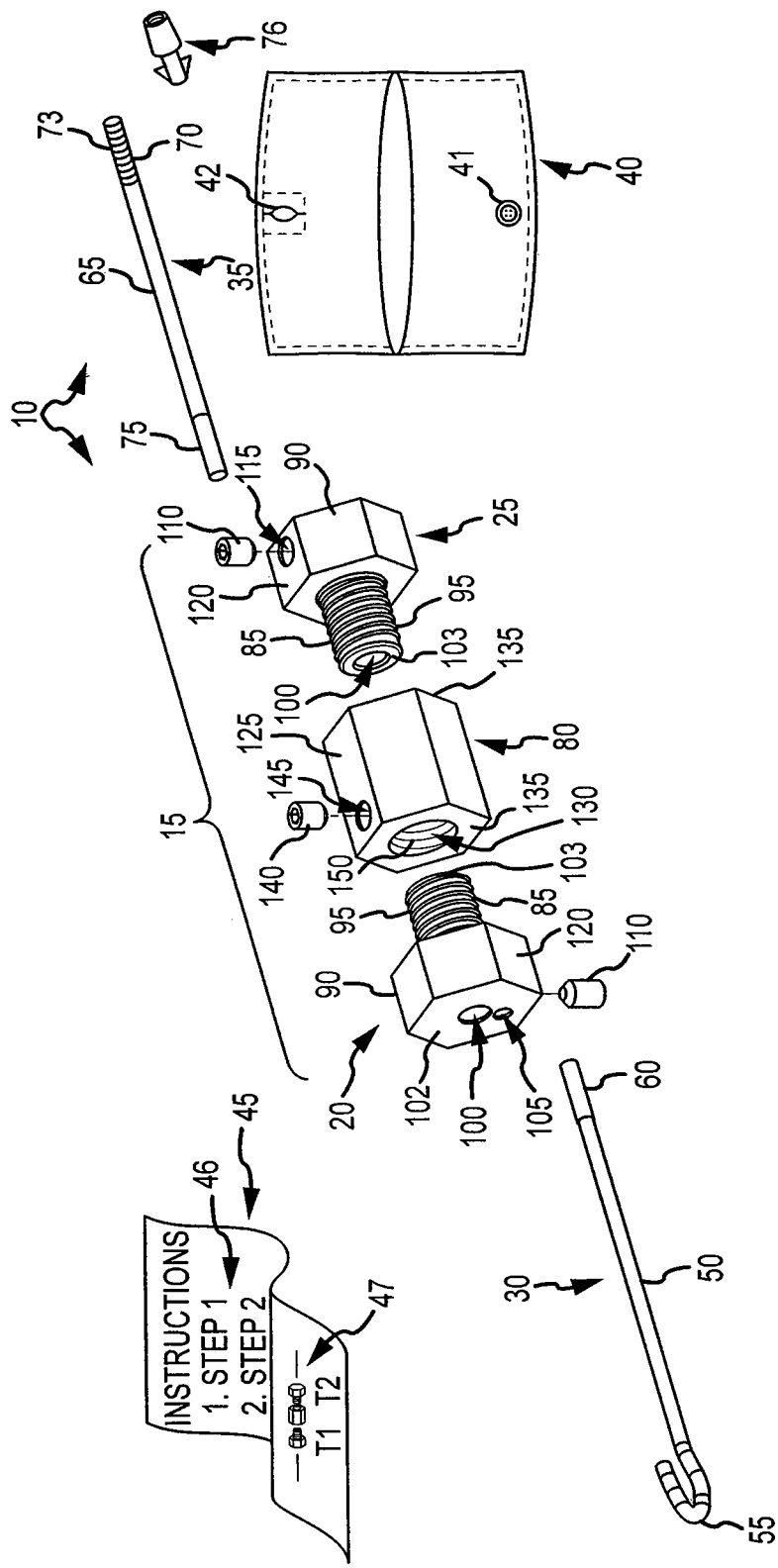
FIG. 1 is an exploded isometric view of the field or emergency spoke repair kit disclosed herein.

Disclosed herein is a bicycle wheel repair kit 10 for joining a first segment 175a of a spoke to a second segment 175b of the spoke, the first segment extending radially outward from a wheel hub 160 to terminate in a first end 155a and the second segment extending radially inward from a wheel rim 165 to terminate in a second free end 155b. In one embodiment, the kit 10 includes a coupler 15 including a first engagement member 20 and a second engagement member 25. The first engagement member 20 is configured to engage the first end 155a. The second engagement member 25 is generally opposite the first engagement member and configured to engage the second end 155b. The coupler 15 is configured such that a distance between the first engagement member 20 and the second engagement member 25 can be adjusted, thereby adjusting the tension in the first segment and second segment, which are joined together via the coupler 15.

For a discussion of one embodiment of the kit 10 disclosed herein, reference is made to FIG. 1, which is an exploded isometric view of the kit 10. As shown in FIG. 1, the kit 10 includes a coupler 15, an adapter hub spoke 30, an adapter rim spoke 35, a re-closable pouch 40, and instructions 45. The re-closable pouch 40 may be formed of nylon, canvas or other synthetic or natural materials and sized and configured to enclose the coupler 15, adapter hub spoke 30 and adapter rim spoke 35. The pouch 40 may have an arrangement for repeated closing of the pouch such as, for example, a button 41 and button hole 42, zipper, hook-and-loop fastening arrangement, etc.

The instructions 45 may be in the form of written instruction 46 and/or diagrammatic instructions 47 regarding the use of the elements of the kit in the repair of a spoke of a bicycle wheel. The instructions may outline any or all of the steps articulated below regarding a method of repairing a bicycle wheel spoke with the kit. The instructions 45 may be provided on a piece of paper or other material and enclosed in the pouch 40, or the instructions may be printed or otherwise supported on a surface of the pouch 40. Alternatively, the instructions 45 may be provided separately, for example, via the internet for downloading onto a personal computer or mobile telephone equipped with internet capability.

As shown in FIG. 1, the adapter hub spoke 30 includes a generally straight shaft 50 that extends in one direction to terminate in a hook end 55 and in the other direction to terminate in a straight tip 60. The straight tip 60 may be slightly larger in diameter than the shaft 50. The adapter hub spoke 30 has an overall length of between approximately 100 millimeters and approximately 180 millimeters and a diameter of between approximately 100 millimeters and approximately 180 millimeters. The adapter hub spoke 30 may be formed of stainless steel, brass, chrome plated brass or steel, zinc plated brass or steel, carbon fiber, titanium, etc. As discussed below in greater detail, the adapter hub spoke can be used to replace a segment of a broken spoke extending from the hub that is too short to be adequately engaged by the coupler 15.

The adapter rim spoke 35 includes a generally straight shaft 65 that extends in one direction to terminate in a threaded end 70 having threads 73 and in the other direction to terminate in a straight tip 75. The straight tip 75 may be slightly larger in diameter than the shaft 65. The adapter rim spoke 35 has an overall length of between approximately 100 millimeters and approximately 180 millimeters and a diameter of between approximately 100 millimeters and approximately 180 millimeters. The adapter rim spoke 35 may be formed of stainless steel, brass, chrome plated brass or steel, zinc plated brass or steel, carbon fiber, titanium, etc. As discussed below in greater detail, the adapter rim spoke can be used to replace a segment of a broken spoke extending from the rim that is too short to be adequately engaged by the coupler 15.

As indicated in FIG. 1, in one embodiment, the kit 10 may also include a replacement universal spoke nipple 76 that can be used to replace a spoke nipple 77 that was originally part of the wheel rim 165 and forms the rim attachment point for the failed spoke. The universal spoke nipple 76 may be configured to be employed with generally any possible size of hole in the rim previously occupied by the spoke nipple 77. An example of an embodiment of the universal spoke nipple 76 is discussed in detail below with respect to FIGS. 18-22.

As illustrated in FIG. 1, in one embodiment, the coupler 15 includes a first engagement member 20, a second engagement member 25 and an intermediate member 80. The first engagement member 20 is generally opposite the second engagement member 25 across the intermediate member 80. As discussed in greater detail below, the intermediate member is configured to join the first engagement member 20 to the second engagement member 25.

The first engagement member 20, the second engagement member 25, and the intermediate member 80 may be formed partly or entirely of stainless steel, brass, chrome plated brass or steel, zinc plated brass or steel, carbon fiber, titanium, etc. The members 20, 25, 80 may be machined, formed, forged or cast.

In one embodiment, the first engagement member 20 is generally identical to the second engagement member 25 with respect to configuration and features, except in one embodiment, threads 85 of the respective engagement members are oppositely threaded from each other. Thus, as can be understood from FIG. 1, each engagement member 20, 25 may be in the form of a bolt having a hex-head 90 and a threaded male shaft 95 extending from the hex-head 90. A central female bore 100, which is coaxial with a center axis of the threaded male shaft 95, extends through the entirety of the engagement member 20, 25 to daylight at the extreme free face 102 of the hex-head 90 and daylight at the extreme free end 103 of the threaded male shaft 95. An offset female bore 105, which is offset from and parallel to the central female bore 100, extends inwardly a limited distance from the extreme free face 102 of the hex-head 90. As described below, the offset female bore 105 of the first engagement member 20 is configured to receive the straight tip 60 of the adapter hub spoke 30, and the offset female bore 105 of the second engagement member 25 is configured to receive the straight tip 75 of the adapter rim spoke 35.

Each engagement member 20, 25 includes a setscrew 110 and a setscrew hole 115 that is configured to threadably receive the setscrew. The hole 115 extends generally perpendicular to the female bores 100, 105 into the hex-head 90 from one of the side facet faces 120 forming the six planar sides of the hex-head. As described below, the hole 115 extends across both the central female bore 100 and the offset female bore 105 to allow the setscrew 110 to secure the straight tip 60, 75 in the offset female bore 105 or a spoke of the wheel in the central female bore 100.

As indicated in FIG. 1, each of the threaded male shafts 95 includes a series of threads 85. In one embodiment, the threads 85 of the male shaft 95 of the first engagement member 20 are threaded in an opposite direction from the threads 85 of the male shaft 95 of the second engagement member 25. In other words, the threads 85 of the first engagement member may be a right hand thread while the threads 85 of the second engagement member may be a left hand thread, or vice versa.

As illustrated in FIG. 1, in one embodiment, the intermediate member 80 is in the form of a hex-nut having a hex-shaped outer surface with side facet faces 125 forming the six planar sides of the hex-nut. The intermediate member 80 also includes a threaded female bore 130, which is coaxial with a center axis of the intermediate member 80 and extends through the entirety of the intermediate member 80 to daylight at the extreme faces 135 of the intermediate member 80.

The intermediate member 80 includes a setscrew 140 and setscrew hole 145 that is configured to threadably receive the setscrew. The hole 145 extends generally perpendicular to the female bore 130 into the intermediate member 80 from one of the side facet faces 125 forming the six planar sides of the hex-nut configuration of the intermediate member 80. As described below, the hole 145 extends across the female bore 130 to allow the setscrew 140 to prevent rotation of the male shaft 95 of the first engagement member 20 within the female bore 130 of the intermediate member 80 once the male shaft 95 is threaded as far as desired into the female bore 130. In one embodiment, an additional setscrew hole 145 may similarly extend through a side facet face 125 into the intermediate member 80 so as to allow an additional setscrew 140 to engage the male shaft 95 of the second engagement member 25 within the female bore 130 of the intermediate member 80 once the male shaft 95 is threaded as far as desired into the female bore 130.

As indicated in FIG. 1, the female bore 130 includes a series of threads 150. In one embodiment, the threads 150 of the female bore 130 of the intermediate member 80 are threaded in a first direction in one half of the female bore 130 and in an opposite direction in the other half of the female bore 130. In other words, the threads 150 of a first half of the female bore 130 may be a right hand thread while the threads 150 of a second half of the female bore 130 may be a left hand thread, or vice versa. Thus, one end of the female bore 130 is adapted to threadably engage with the threads 95 of the male shaft 85 of the first engagement member 20, and the other end of the female bore 130 is adapted to threadably engage with the threads 95 of the male shaft 85 of the second engagement member 20.

In one embodiment, the central female bores 100 of the each engagement member 20, 25 will have a diameter of between approximately 2.5 millimeters and approximately 5 millimeters. In one embodiment, the female bore 130 of the intermediate member 80 will have a diameter of between approximately 3 millimeters and approximately 10 millimeters.

Figure 2:
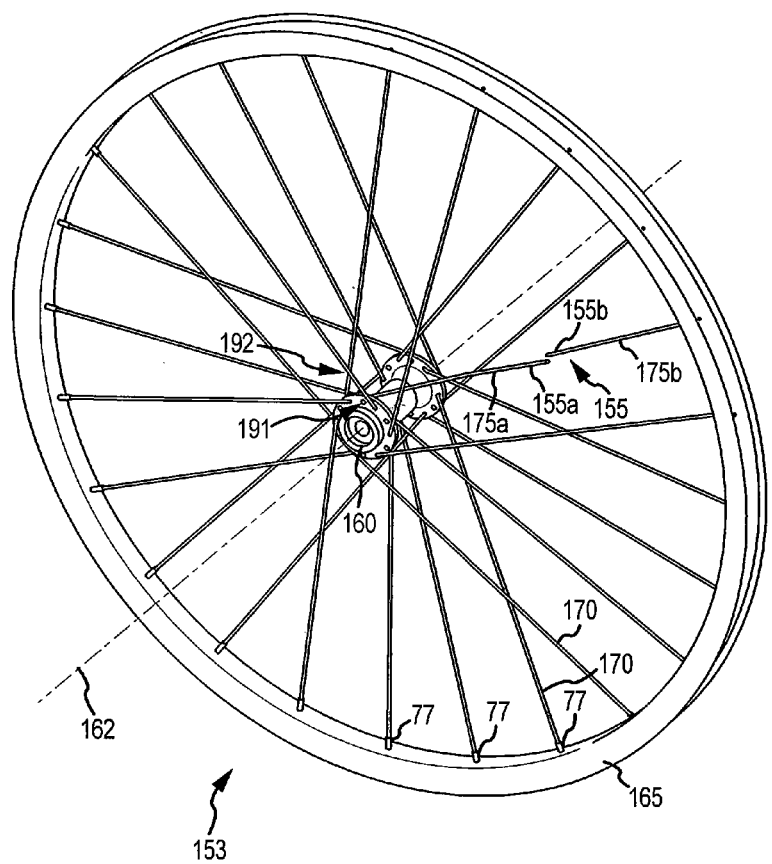
FIG. 2 is an isometric view of a bicycle wheel with a broken spoke.

For further discussion of the features of the coupler 15 and its interaction with the spokes of a bicycle wheel, reference is first made to FIG. 2, which is an isometric view of a bicycle wheel 153 with a broken spoke 155. As shown in FIG. 2, a bicycle wheel 153 includes a hub 160 extending about a rotational axis 162 of the wheel, a rim 165 spaced apart from, and circumferentially extending about, the hub, and a plurality of spokes 170 radially extending from the hub 160 to the rim 165. A spoke 155 has failed intermediate its overall length, resulting in a first spoke segment 175a and a second spoke segment 175b. The first spoke segment 175a radially projects outward from the hub 160 to terminate in a free or broken end 155a resulting from the structural failure of the spoke. The second spoke segment 175b radially projects inward from the rim 165 to terminate in a free or broken end 155b resulting from the structural failure of the spoke. Because of the lack of tension in the location of the rim occupied by the broken spoke 150, the wheel 153 will be out of round and likely not fit for riding.

Figure 3:
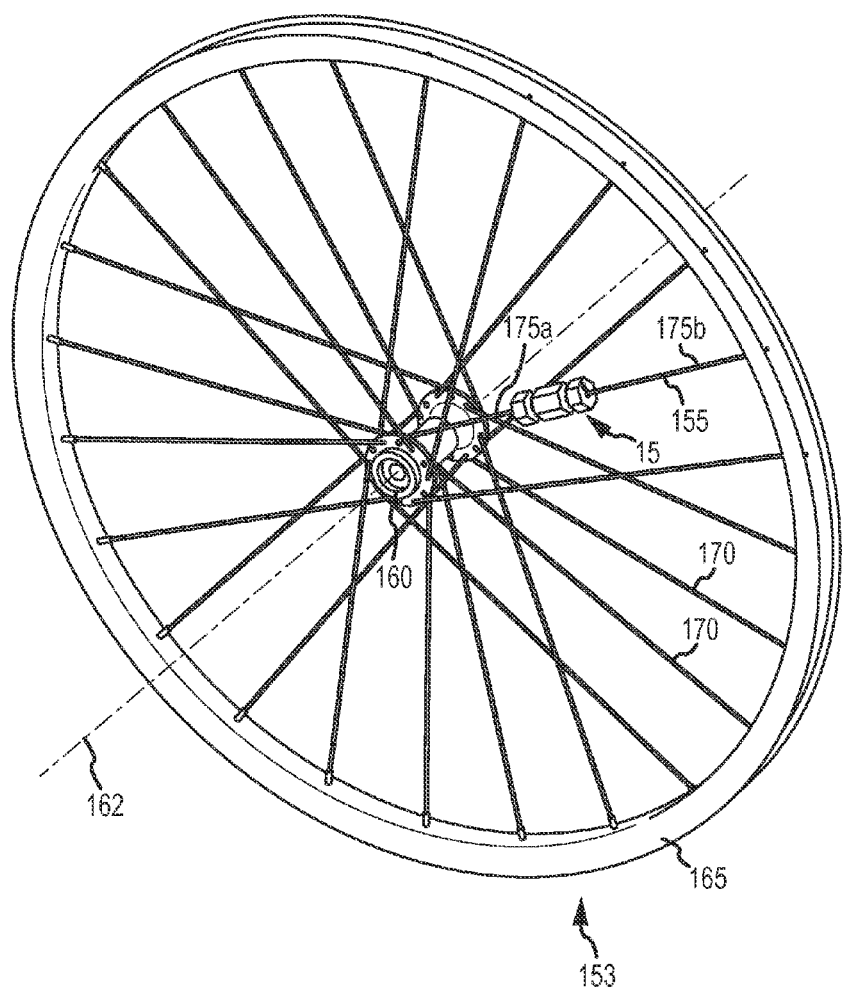
FIG. 3 is the same view as FIG. 2, except the coupler has been applied to the broken spoke to make a field or emergency repair of the spoke.

As illustrated in FIG. 3, which is the same view as FIG. 2, except the coupler 15 has been applied to the broken spoke 155 to make a field or emergency repair of the spoke 155, the coupler 15 can be used to join together the two spoke segments 175a, 175b. As a result, the spoke 155 can be tensioned via the coupler 15 to a tension that places the wheel 153 back into round and in a condition that can be ridden. The spoke 155 can then be replaced once the bicycle has been ridden to a location where the spoke 155 can be replaced with a new spoke.

Figure 4:
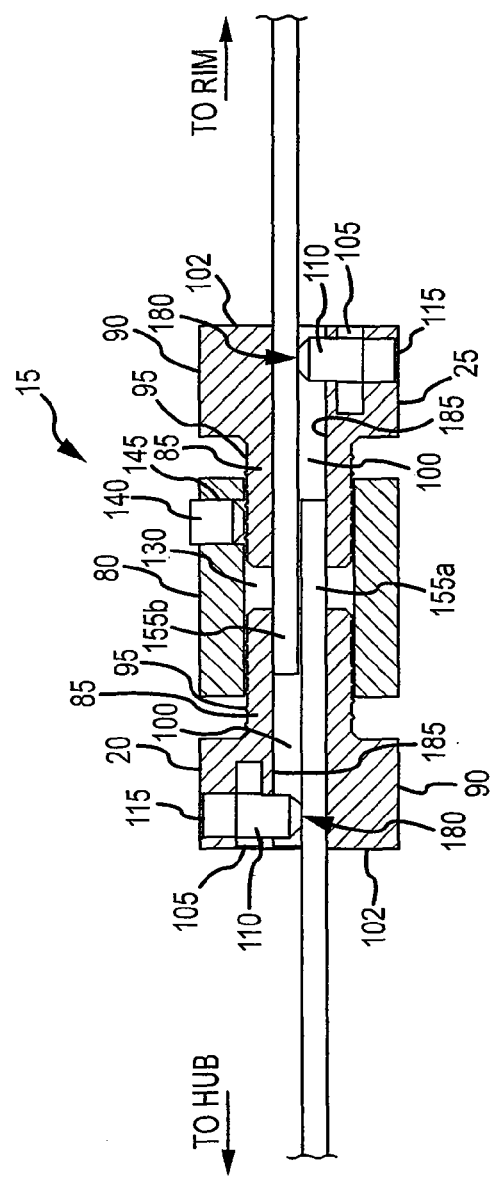
FIG. 4 is a longitudinal cross sectional elevation of the coupler joining together the broken spoke as depicted in FIG. 3.

As indicated in FIG. 4, which is a longitudinal cross sectional elevation of the coupler 15 joining together the broken spoke 155 as depicted in FIG. 3, the first broken spoke end 155a extends into and is secured in the central female bore 100 of the first engagement member 20. Specifically, the setscrew 110 is threaded deep into the hole 115 to extend across the offset female bore 105 to protrude into the central female bore 100 of the first engagement member 20, the tip 180 of the setscrew 110 pinching or clamping the first broken spoke end 155a against an inner circumferential surface 185 of the central female bore 100 and securing the first broken spoke end 155a within the first engagement member 20.

Similarly, the second broken spoke end 155b extends into and is secured in the central female bore 100 of the second engagement member 25. Specifically, the setscrew 110 is threaded deep into the hole 115 to extend across the offset female bore 105 to protrude into the central female bore 100 of the second engagement member 25, the tip 180 of the setscrew 110 pinching or clamping the second broken spoke end 155b against an inner circumferential surface 185 of the central female bore 100 and securing the second broken spoke end 155b within the second engagement member 25.

As depicted in FIG. 4, the threaded male shafts 85 of the first engagement member 20 and the second engagement member 25 are each received in opposite ends of the female bore 130 of the intermediate member 80. The intermediate member 80 has been rotated relative to the first engagement member 20 and the second engagement member 25 such that the male shafts 85 of the engagement members 20, 25 are located rather deeply within the female bore 130 of the intermediate member 80. In one embodiment, on account of the threads 95 of the male shafts 85 of the engagement members 20, 25 being oppositely threaded from each other and the threads 150 in a first half of the female bore 130 being opposite threaded from the threads 150 in a second half of the female bore 130, the intermediate member 80 can be rotated in a first direction and cause both engagement members 20, 25 to thread inward in the intermediate member 80 and rotate in a second direction and cause both engagement members 20, 25 to thread outward in the intermediate member 80. In other words, the described oppositely threaded arrangement allows the rotation of the intermediate member 80 in a first direction relative to the engagement members 20, 25 to cause both engagement members to move into the intermediate member and rotation of the intermediate member 80 in a second direction opposite the first direction to cause both engagement members to move out of the intermediate member.

As the male shafts 85 are threaded ever deeper into the intermediate member 80, the tips of the spoken broken ends 155a, 155b are moved ever deeper into the intermediate member and ever closer to each other, even increasingly overlapping each other within the confines of the female bores 100, 130. In other words, as the male shafts 85 are threaded ever deeper into the intermediate member 80, the distance between the engagement members 20, 25 is ever decreased.

Once the engagement members 20, 25 are threaded into the intermediate member 80 as deeply as needed to establish a desired tension in the broken spoke 155, the setscrew 140 can be thread into the hole 145 such that the tip 180 of the setscrew engages the male shaft 85 of an engagement member 25, thereby securing the position of the engagement member 25 relative to the intermediate member 80 and maintaining the established tension in the broken spoke 155. In embodiments with a second such setscrew 140 and hole 145, the setscrew may be screwed into engagement with the male shaft 85 of the other engagement member 20 similarly fixing the relationship of the engagement member 20 relative to the intermediate member 80.

Figure 5:
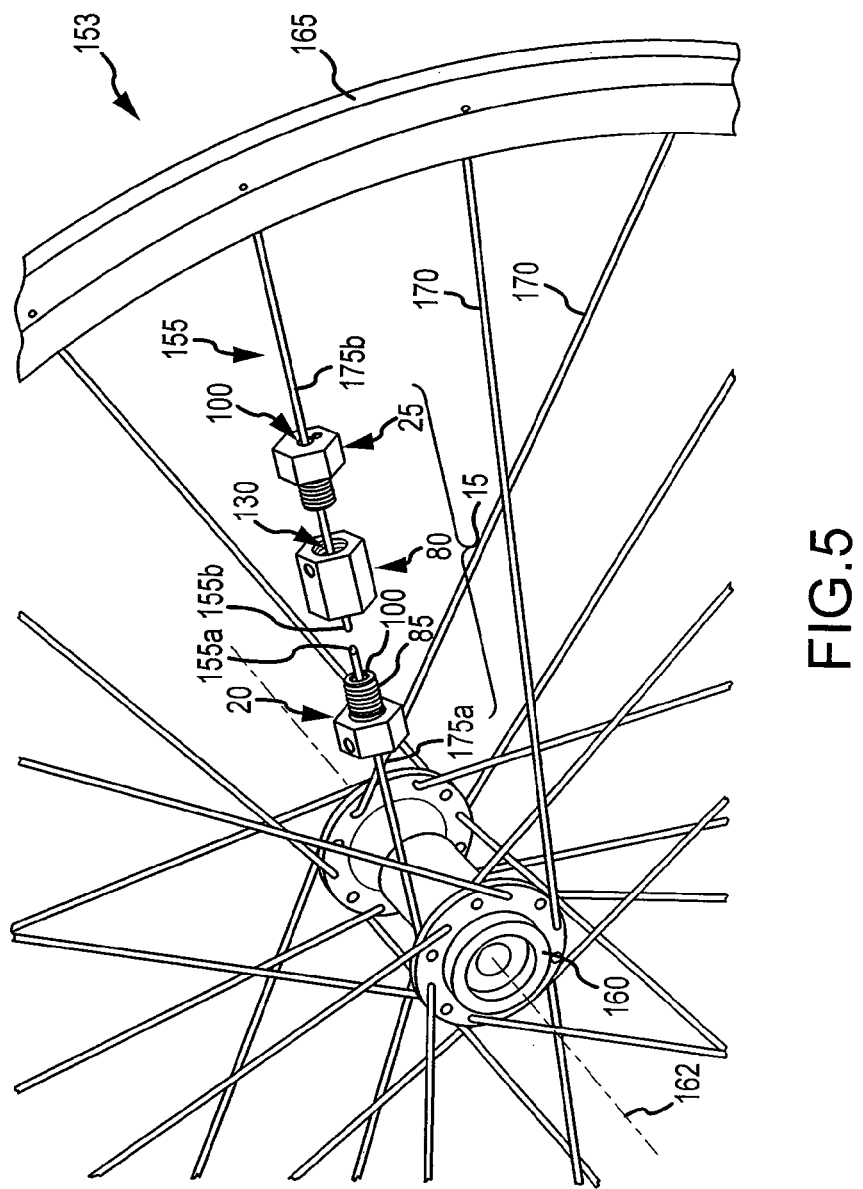
FIG. 5 is an enlarged view of the broken spoke region of FIG. 2, except the coupler is in the process of being applied to the broken spoke ends.

For a discussion of a method of employing the coupler 15 to repair the broken spoke 155, reference is made to FIGS. 2 and 5. FIG. 5 is an enlarged view of the broken spoke region of FIG. 2, except the coupler 15 is in the process of being applied to the broken spoke ends 155a, 155b. As can be understood from FIGS. 2 and 5, the first broken spoke end 155a is inserted into and through the central female bore 100 of the first engagement member 20. The second broken spoke end 155b is inserted into and through the central female bore 100 of the second engagement member 25. The intermediate member 80 is positioned about the second broken spoke end 155b such that the spoke end 155b extends into and through the female bore 130 of the intermediate member. The members 20, 25, 80 are brought together and the threaded male shafts 85 of the engagement members 20, 25 are threaded into the respective ends of the threaded female bore 130 of the intermediate member 80. The setscrews 110 of each engagement member 20, 25 are used to secure each spoke segment 175a, 175b in its respective engagement member 20, 25, as shown in FIG. 4. The intermediate member 80 is then threaded relative to the engagement members 20, 25 in a direction that causes the threaded shafts 85 to increasingly travel into the threaded bore 130, increasingly tensioning the spoke segments 175a, 175b. A hex wrench engaging the facet faces 125 of the hex-nut surface of the intermediate member 80 can be used to cause the member 80 to rotate relative to the other members 20, 25. Alternatively, a pin, allen wrench or screwdriver can be inserted into the setscrew hole 145 to lever the member 80 into rotation. Any of these extra tools can be enclose in the pouch 40 as part of the kit 10.

Once the desired tension is established in the spoke 155, the setscrew(s) 140 can be caused to engage the threaded male shaft(s) of the engagement member(s), as indicated in FIG. 4. The spoke 155 now appears as depicted in FIG. 3, the spoke 155 being properly tensioned to return the wheel back to round and a condition that can be ridden until a new spoke can replace the field-repaired spoke 155. To remove the coupler 15 to allow for the new spoke to replace the field-repaired spoke 155, the above-described installation steps are simply reversed.

While the preceding discussion takes place in the context of the spoke being broken intermediate its overall length, spokes can also break at the hub 160 or rim 165. As will be shown below, all three types of breaks can be addressed with the repair kit 10 disclosed herein.

For a discussion directed to the repair of a spoke break near or at the rim 165, reference is made to FIG. 6, which is the same view as FIG. 4, except employing the adapter rim spoke 35. As can be understood from FIG. 6, for the coupler 15 to be employed to repair a spoke break near the rim 165, the first broken spoke end 155a, which is a free end region of the spoke segment 175a that extends from the hub 160, is coupled to the first engagement member 20. In other words, the first broken spoke end 155a extends into and is secured in the central female bore 100 of the first engagement member 20. Specifically, the setscrew 110 is threaded deep into the hole 115 to extend across the offset female bore 105 to protrude into the central female bore 100 of the first engagement member 20, the tip 180 of the setscrew 110 pinching or clamping the first broken spoke end 155a against an inner circumferential surface 185 of the central female bore 100 and securing the first broken spoke end 155a within the first engagement member 20.

Since the spoke break is near or at the rim 165, the second broken spoke end 155b is at the inner circumferential extent of the rim 165 or otherwise so close to the inner circumferential extent of the rim 165 such that the second broken spoke end 155b is too short to allow the second engagement member 25 to engage the second broken spoke end 155b. Accordingly, the second spoke segment 175b is removed from the rim 165 by unthreading the segment 175b from the rim 165. The adapter rim spoke 35 is provided from the kit 10 and the threaded end 70 of the adapter rim spoke 35 is threaded into the rim 165 at the location from which the second spoke segment 155b was removed.

As shown in FIG. 6, the straight tip 75 of the adapter rim spoke 35 is received in the offset female bore 105 of the second engagement member 25 and secured in the offset female bore 105 of the second engagement member 25. Specifically, the setscrew 110 is threaded into the hole 115 to protrude into the offset female bore 105 of the second engagement member 25, the tip 180 of the setscrew 110 pinching or clamping the straight tip 75 against an inner circumferential surface of the offset female bore 105 and securing the adapter rim spoke 35 within the second engagement member 25.

As depicted in FIG. 6, the threaded male shafts 85 of the first engagement member 20 and the second engagement member 25 are each received in opposite ends of the female bore 130 of the intermediate member 80. The intermediate member 80 has been rotated relative to the first engagement member 20 and the second engagement member 25 such that the male shafts 85 of the engagement members 20, 25 are located rather deeply within the female bore 130 of the intermediate member 80. In one embodiment, on account of the threads 95 of the male shafts 85 of the engagement members 20, 25 being oppositely threaded from each other and the threads 150 in a first half of the female bore 130 being opposite threaded from the threads 150 in a second half of the female bore 130, the intermediate member 80 can be rotated in a first direction and cause both engagement members 20, 25 to thread inward in the intermediate member 80 and rotate in a second direction and cause both engagement members 20, 25 to thread outward in the intermediate member 80. In other words, the described oppositely threaded arrangement allows the rotation of the intermediate member 80 in a first direction relative to the engagement members 20, 25 to cause both engagement members to move into the intermediate member and rotation of the intermediate member 80 in a second direction opposite the first direction to cause both engagement members to move out of the intermediate member.

As the male shafts 85 are threaded ever deeper into the intermediate member 80, the tips 155a, 75 are moved ever closer to each other. In other words, as the male shafts 85 are threaded ever deeper into the intermediate member 80, the distance between the engagement members 20, 25 is ever decreased.

Once the engagement members 20, 25 are threaded into the intermediate member 80 as deeply as needed to establish a desired tension in the broken spoke 155 (e.g., in this case, the first spoke segment 175a and the adapter rim spoke 35), the setscrew 140 can be thread into the hole 145 such that the tip 180 of the setscrew engages the male shaft 85 of an engagement member 25, thereby securing the position of the engagement member 25 relative to the intermediate member 80 and maintaining the established tension in the broken spoke 155.

For a discussion directed to the repair of a spoke break near or at the hub 160, reference is made to FIG. 7, which is the same view as FIG. 4, except employing the adapter hub spoke 30. As can be understood from FIG. 7, for the coupler 15 to be employed to repair a spoke break near the hub 160, the second broken spoke end 155b, which is a free end region of the spoke segment 175b that extends from the rim 165, is coupled to the second engagement member 25. In other words, the second broken spoke end 155b extends into and is secured in the central female bore 100 of the second engagement member 25. Specifically, the setscrew 110 is threaded deep into the hole 115 to extend across the offset female bore 105 to protrude into the central female bore 100 of the second engagement member 25, the tip 180 of the setscrew 110 pinching or clamping the second broken spoke end 155b against an inner circumferential surface 185 of the central female bore 100 and securing the second broken spoke end 155b within the second engagement member 25.

Since the spoke break is near or at the hub 160, the first broken spoke end 155a is at the outer circumferential extent of the hub 160 or otherwise so close to the outer circumferential extent of the hub 160 such that the first broken spoke end 155a is too short to allow the first engagement member 20 to engage the first broken spoke end 155a. Accordingly, the first spoke segment 175a is pushed aside or removed from the hub 160 by unhooking the segment 175a from a spoke hole 191 in the hub 160. As can be understood from FIGS. 2 and 7, the adapter hub spoke 30 is provided from the kit 10 and the hooked end 55 of the adapter hub spoke 30 is hooked into the hub 160 at the spoke hole 191 from which the first spoke segment 155a was removed or hooked into an adjacent crisscross intersection 192 of unbroken spokes 170.

As shown in FIG. 7, the straight tip 60 of the adapter hub spoke 30 is received in the offset female bore 105 of the first engagement member 20 and secured in the offset female bore 105 of the first engagement member 20. Specifically, the setscrew 110 is threaded into the hole 115 to protrude into the offset female bore 105 of the first engagement member 20, the tip 180 of the setscrew 110 pinching or clamping the straight tip 60 against an inner circumferential surface of the offset female bore 105 and securing the adapter hub spoke 30 within the first engagement member 20.

As depicted in FIG. 7, the threaded male shafts 85 of the first engagement member 20 and the second engagement member 25 are each received in opposite ends of the female bore 130 of the intermediate member 80. The intermediate member 80 has been rotated relative to the first engagement member 20 and the second engagement member 25 such that the male shafts 85 of the engagement members 20, 25 are located rather deeply within the female bore 130 of the intermediate member 80. In one embodiment, on account of the threads 95 of the male shafts 85 of the engagement members 20, 25 being oppositely threaded from each other and the threads 150 in a first half of the female bore 130 being opposite threaded from the threads 150 in a second half of the female bore 130, the intermediate member 80 can be rotated in a first direction and cause both engagement members 20, 25 to thread inward in the intermediate member 80 and rotate in a second direction and cause both engagement members 20, 25 to thread outward in the intermediate member 80. In other words, the described oppositely threaded arrangement allows the rotation of the intermediate member 80 in a first direction relative to the engagement members 20, 25 to cause both engagement members to move into the intermediate member and rotation of the intermediate member 80 in a second direction opposite the first direction to cause both engagement members to move out of the intermediate member.

As the male shafts 85 are threaded ever deeper into the intermediate member 80, the tips 155b, 60 are moved ever closer to each other. In other words, as the male shafts 85 are threaded ever deeper into the intermediate member 80, the distance between the engagement members 20, 25 is ever decreased.

Once the engagement members 20, 25 are threaded into the intermediate member 80 as deeply as needed to establish a desired tension in the broken spoke 155 (e.g., in this case, the second spoke segment 175b and the adapter hub spoke 30), the setscrew 140 can be thread into the hole 145 such that the tip 180 of the setscrew engages the male shaft 85 of an engagement member 25, thereby securing the position of the engagement member 25 relative to the intermediate member 80 and maintaining the established tension in the broken spoke 155.

For a discussion of a method of employing the coupler 15 to repair the broken spoke 155 by using one of the adapter spokes 30, 35, reference is made to FIGS. 2 and 8-10. FIGS.

8-10 are isometric views of the coupler 15 being progressively assembled and coupled to a broken spoke segment and employing one of the adapter spokes to complete an emergency or field repair of the broken spoke.

Figure 8:
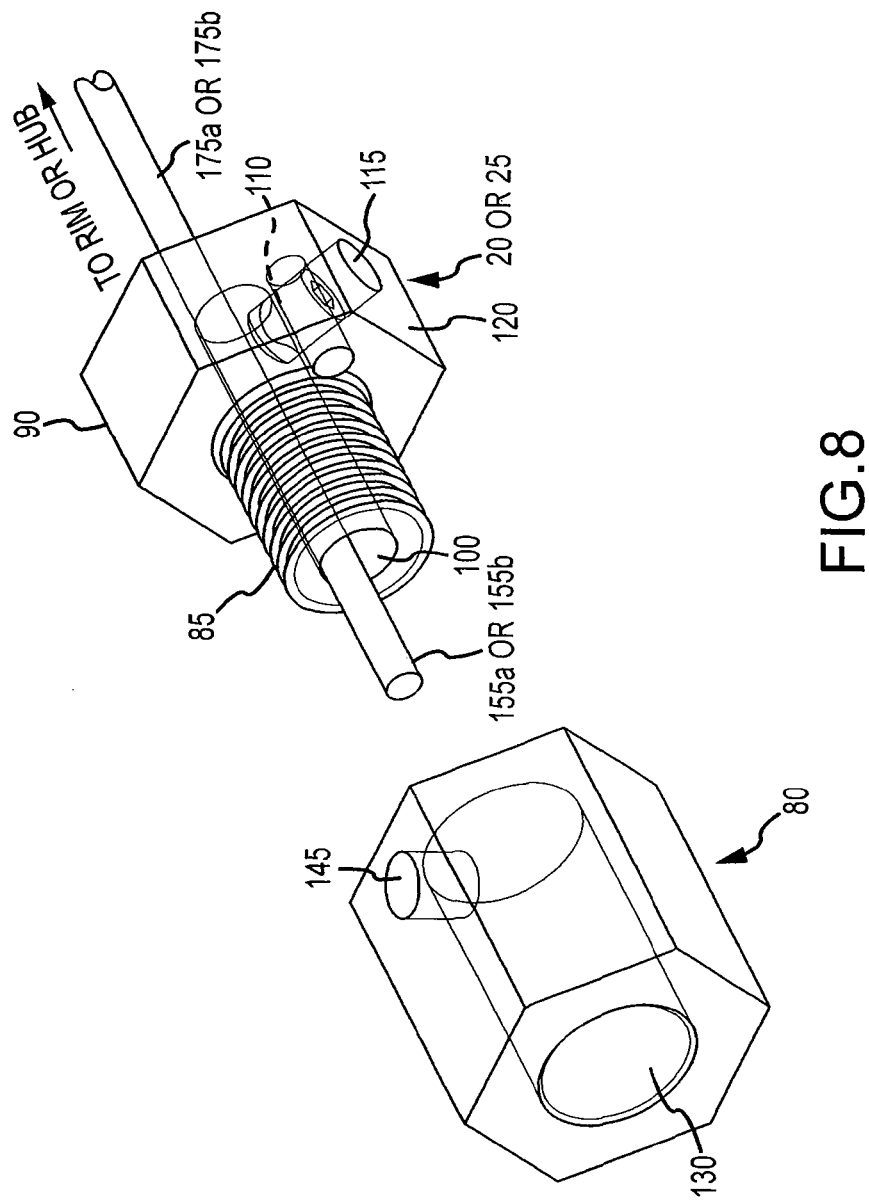
FIGS. 8-10 are isometric views of the coupler being progressively assembled and coupled to a broken spoke segment and employing one of the adapter spokes to complete an emergency or field repair of the broken spoke.

As can be understood from FIGS. 2 and 8, a broken spoke end 155a, 155b is inserted into and through the central female bore 100 of an engagement member 20, 25. A setscrew 110 is used to secure the broken spoke end within the engagement member.

Figure 9:
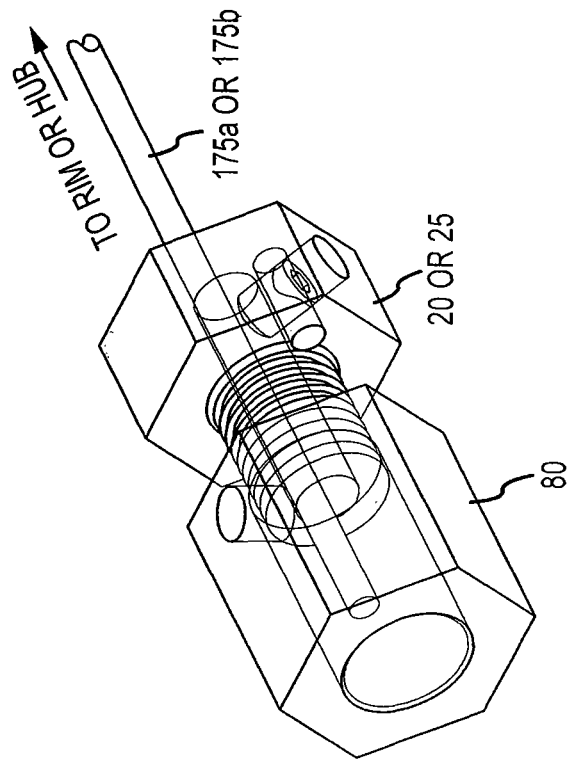
Figure 9:
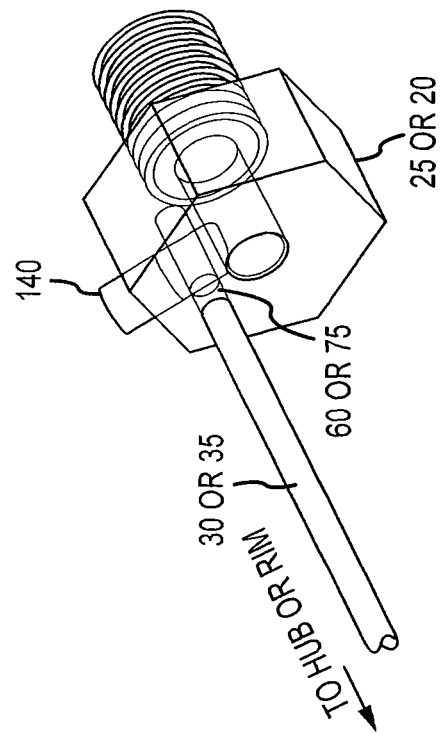

As illustrated in FIG. 9, the straight tip 60, 75 of the adapter spoke 30, 35 is received in the offset female bore 105 of the engagement member 30, 35. The end 55, 70 of the adapter spoke 30, 35 is coupled, as the nature of the break may call for, to either of the hub 160 or rim 165. In transitioning from FIG. 9 to FIG. 10, the engagement members 20, 25 are threaded into the intermediate member 80 and, once so threadably coupled to each other, a setscrew 110 is used to secure the straight tip 60, 75 in the offset female bore 105 as shown in FIG. 10.

Figure 10:
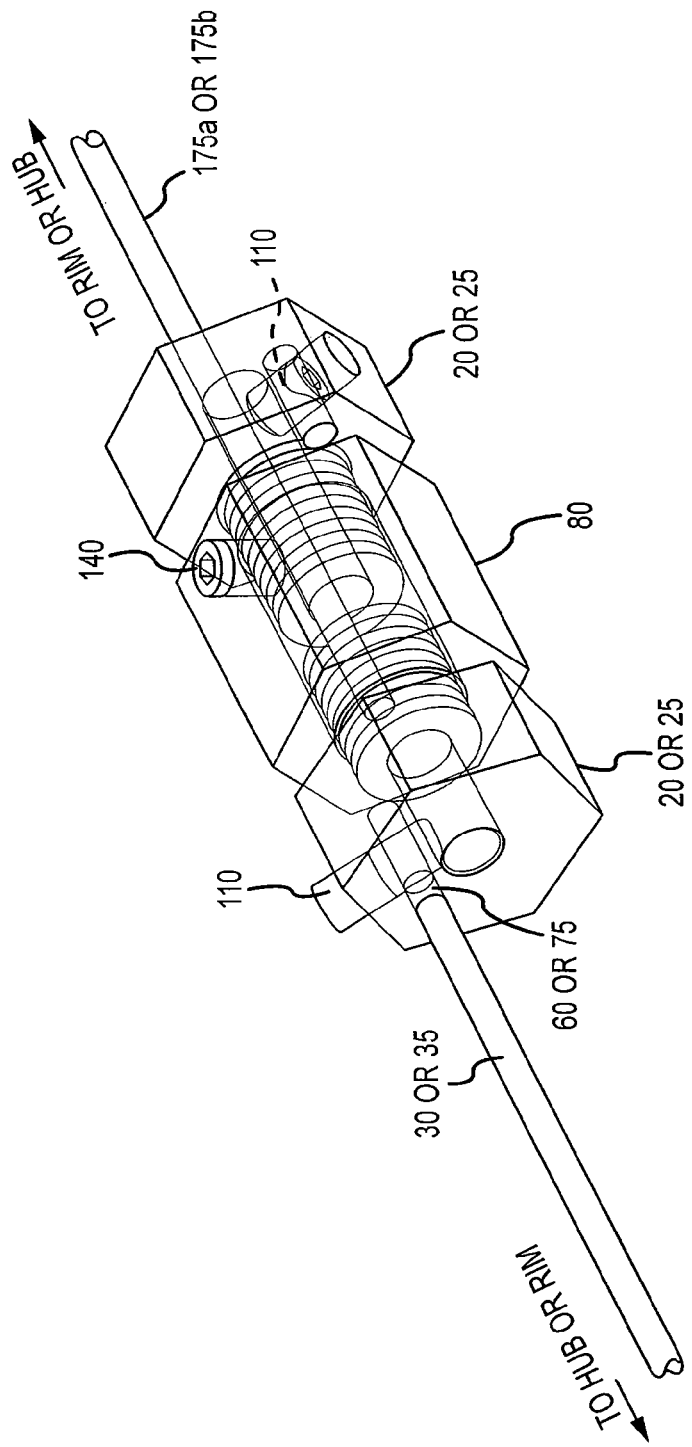

As can be understood from FIG. 10, the engagement members 20, have been sufficiently threaded into the intermediate member 80 to create a desired tension in the resulting field repaired spoke. The setscrew 140 is used to secure the engagement member(s) to the intermediate member.

While the embodiments discussed above with respect to FIGS. 1-10 are discussed in the context of the shafts 85 of the engagement members 20, being male shafts and the bore 130 of the intermediate member 80 being a female bore, in other embodiments, the arrangements may be reversed as to which shafts are male and which are female.

Figure 11:
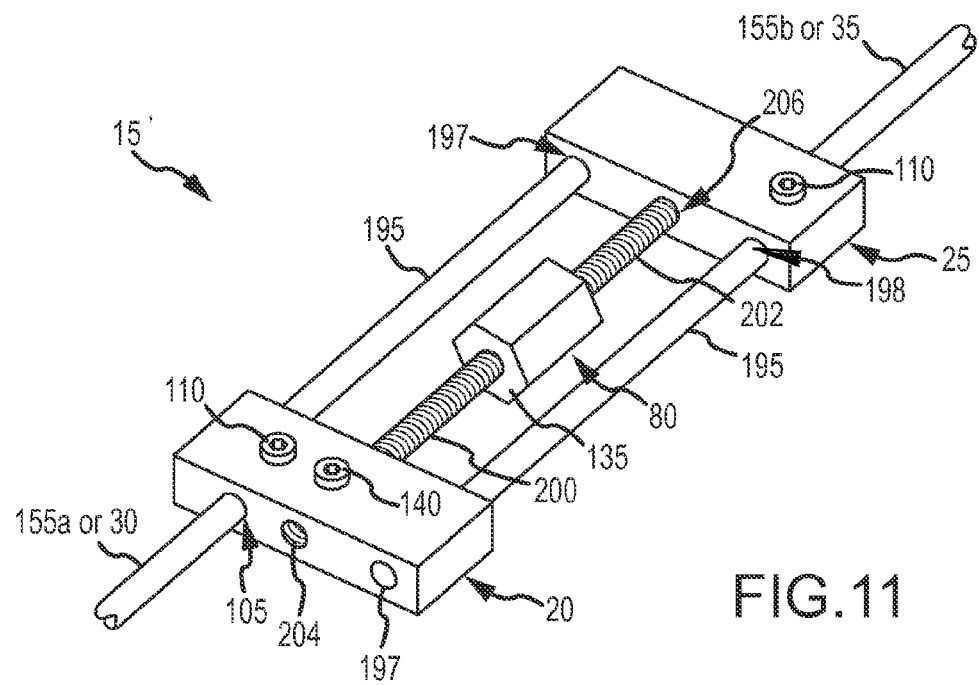
FIG. 11 is an isometric view of another embodiment of the coupler.

For example, as shown in FIG. 11, which is an isometric view of another embodiment of the coupler 15', the coupler 15' includes a first engagement member 20, a second engagement member 25 and an intermediate member 80. The first engagement member 20 is generally opposite the second engagement member 25 across the intermediate member 80.

Each engagement member 20, 25 includes a female bore 105 with a setscrew 110. Each female bore is configured to receive both broken spoke ends 155a, 155b and adapter spokes 30, 35 as needed, the setscrew 110 being used for securing the broken spoke end or adapter spoke received in the female bore 105.

Each engagement member 20, 25 includes a smooth guide rod 195 and a guide rod hole 197. Each guide rod 195 is rigidly connected at its connected end 198 to its engagement member and the free end 199 of the guide rod is slideably received in the guide rod hole 197 of the opposing engagement member.

The intermediate member 80 includes a first threaded male shaft 200 a second threaded male shaft 202. The threaded male shafts 200, 202 extend coaxial with a center axis of the intermediate member 80 and from opposite faces 135 of the intermediate member.

Each engagement member 20, 25 includes a central threaded female bore 204, 206 that threadably receives a respective threaded male shaft 200, 202 of the intermediate member 80. The two threaded male shafts 200, 202 are oppositely thread from each other, and each corresponding threaded female bore 204, 206 is threaded to threadably receive its corresponding threaded male shaft 200, 202. Thus, as can be understood from FIGS. 11 and 12, as the intermediate member 80 is rotated relative to the engagement members 20, 25 in a first direction, the male threaded shafts 200, 202 are increasingly threaded into the respective female threaded shafts 204, 206, causing the guide rods 195 to be increasingly received in the respective guide holes 197 as the distance between the engagement members 20, 25 is decreased. Such a decrease in the distance between the two engagement members increases the tension in the spoke ends 155a, 155b or spoke-like members 30, 35 coupled to the coupler 15'. A setscrew 140 that extends into one of the threaded female bores 204 can be used to engage the corresponding threaded male shaft 200 to prevent further rotation of the intermediate member relative to the engagement members.

Figure 12:
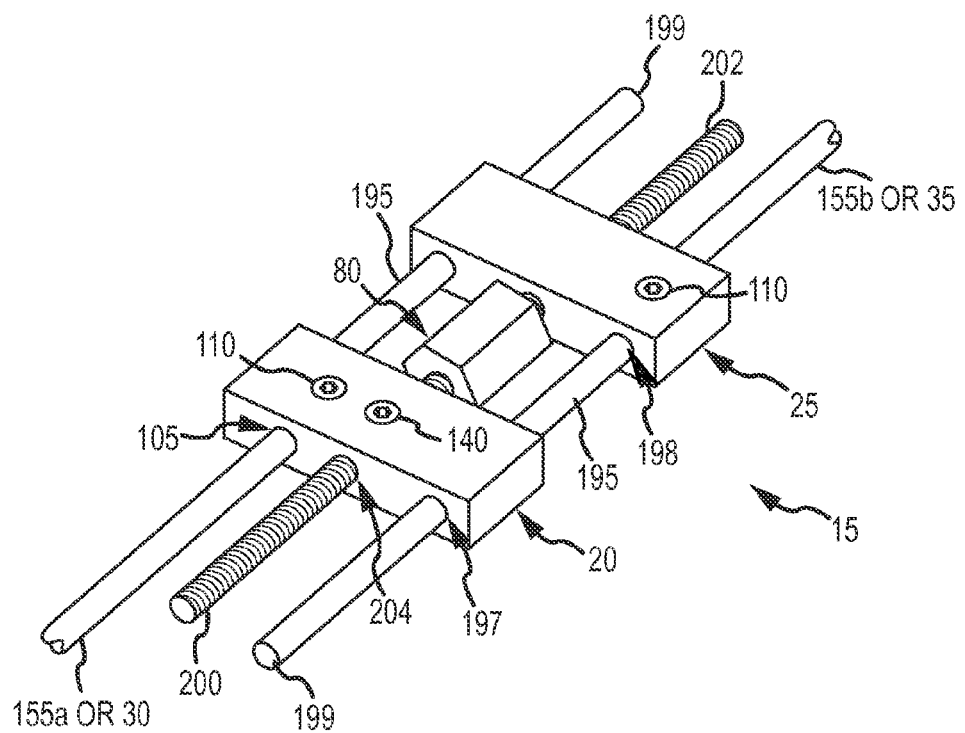
FIG. 12 is the same view as FIG. 11, except the coupler has been used to create tension in spoke segments or spoke-like members.

As can be understood from FIGS. 11 and 12, rotating the intermediate member in a direction opposite the above described direction causes the engagement members to move further apart, thereby decreasing the tension in the spokes or equivalents.

As illustrated in FIGS. 11 and 12, the intermediate member may have a hex-nut configuration to allow it to be engaged by a wrench. Alternatively or additionally, the intermediate member may have a hole for receiving a shaft for levering the intermediate member about its axis.

Figure 13:
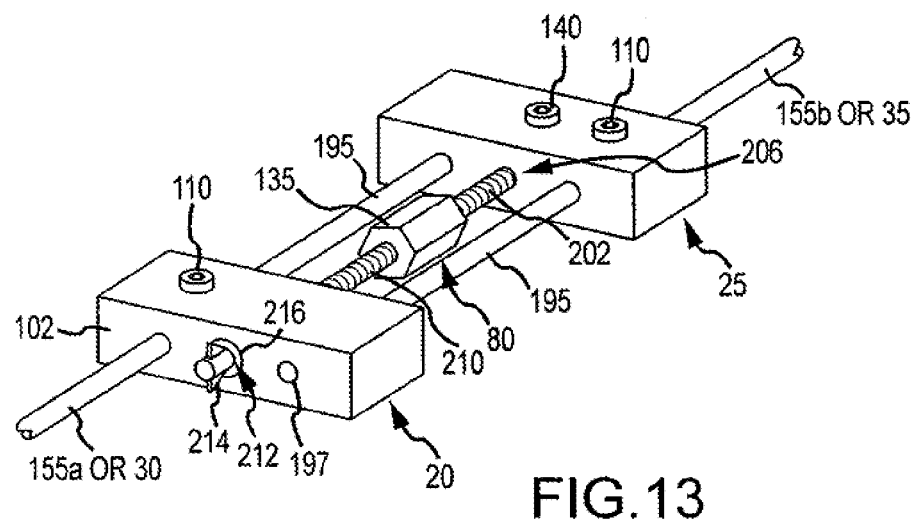
FIG. 13 is the same view as FIG. 11, except of a single thread version of the embodiment depicted in FIG. 11.

As shown in FIG. 13, which is the same view as FIG. 11, except of a single thread version of the embodiment depicted in FIG. 11, the intermediate member 80 has a single threaded male shaft 202 and a single smooth (non-threaded) shaft 210 extending coaxially along the central axis of the intermediate member and from opposite faces 135 of the intermediate member. The threaded shaft 202 is threadably received in a threaded female bore 206 of the second engagement member 25, and the smooth male shaft 210 is rotateably received in a smooth (non-threaded) female bore 212 of the first engagement member 20. The smooth male shaft 210 is prevented from exiting the smooth female bore 212 by a cotter pin 214 and washer 216 arrangement on each end face 102 of the first engagement member 20. Generally speaking, all other aspects of the coupler 15' are the same as discussed above with respect to FIG. 11.

As can be understood from FIG. 13, the intermediate member 80 can be caused to rotate in first direction, causing the smooth male shaft 210 to rotate freely and without longitudinal displacement within the smooth female bore 212 and causing the threaded male shaft 202 to threadably displace longitudinally within the threaded female bore 206. Thus, the second engagement member 25 will move closer to the intermediate member 80 and, as a result, the first engagement member 20, although the first engagement member does not change its distance relationship relative to the intermediate member. Rotating the intermediate member in a second direction opposite the first direction increases the aforementioned distances.

While the embodiments discussed above with respect to FIGS. 1-13 are discussed in the context of the intermediate member 80 being threadably engaged with one or more of the engagement members 20, 25 in order to change the distance between the engagement members, in other embodiments, the distance between the engagement members may be impacted via other mechanical arrangements.

Figure 14:
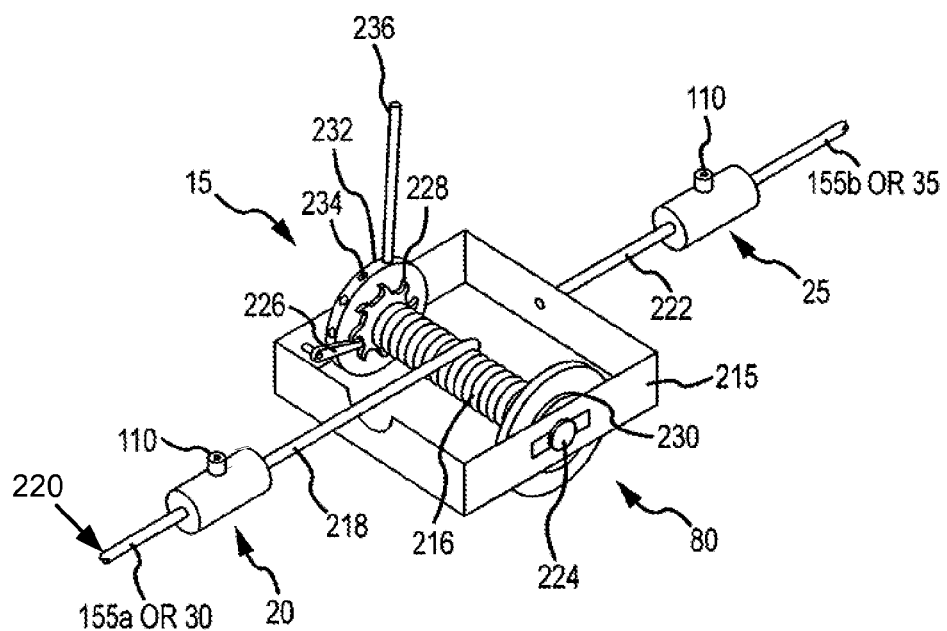
FIG. 14 is an isometric view of another embodiment of the coupler 15.

For example, as shown in FIG. 14, which is an isometric view of another embodiment of the coupler 15", the coupler 15" includes a first engagement member 20, a second engagement member 25 and an intermediate member 80. The first engagement member 20 is generally opposite the second engagement member 25 across the intermediate member 80.

The intermediate member 80 includes a frame 215, a drum 216 rotatably supported in the frame, and a rope like member 218 (e.g., rope, cable, etc.) wound about the drum 216. A free end 220 of the rope 218 extends from the rest of the rope wound about the drum to be connected to the first engagement member 20. A tail piece 222, which may be a rope, cable, wire, rod, etc. extends from the frame 215 to connect to the second engagement member 25.

Rotation axis points 224 rotatably support the drum 216 in the frame 215. A pawl 226 supported off of the frame engages pawl teeth 228 on the drum. A spring 230 provides a biasing force between the drum and the frame. A wheel end 232 of the drum includes holes 234 in which a lever arm pin 236 can be received to cause the drum to rotate in a desired direction. The pawl 226 can be set such that rotational progress of the drum 216 in a first direction via the lever arm pin 236 can be maintained via the pawl engaging a pawl tooth 228. The spring 230 acts between the frame 215 and the drum 216 to bias the pawl teeth against the pawl. The pawl can be reset so as to not engage the pawl teeth, thereby allowing the rotational progress of the drum in a first direction to be reversed.

As shown in FIG. 14, each engagement member 20, 25 includes a female bore 105 with a setscrew 110. Each female bore is configured to receive both broken spoke ends 155a, 155b and adapter spokes 30, 35 as needed, the setscrew 110 being used for securing the broken spoke end or adapter spoke received in the female bore 105.

As can be understood from FIG. 14, the pawl is disengaged from the pawl teeth to allow a desired amount of slack rope to be fed from the drum, thereby allowing sufficient slack in the coupler 15" to allow the engagement members to be connected to the spoke segments or equivalents. Once the engagement members are securely connected to their respective spoke segments or equivalents, the pawl can be set to engage the pawl teeth. The lever arm pin is inserted into a hole on the drum wheel end and used to lever the drum in a rotational direction that cause the rope to be increasingly wound about the drum, thereby decreasing the distance between the engagement members. The pawl engages a new pawl tooth as the drum is increasingly caused to rotate, preventing the increasing tension in the spoke segments from being released. The levering of the drum continues until the desired tension is achieved in the spoke segments. To release the tension in the spoke segments, the pawl is taken out of engagement with the pawl teeth and the slack is allowed to pull off of the drum.

While the embodiments discussed above with respect to FIGS. 1-14 are discussed in the context of the engagement members 20, 25 being engaged with the spoke ends 155a, 155b or adapter spokes 30, 35 via holes 100, 105 and setscrews 110, in other embodiments, engagement may be achieved via other mechanical arrangements. For example, various clamping mechanisms may be employed such as ones known by those skilled in art of clamping mechanisms.

Figure 15:
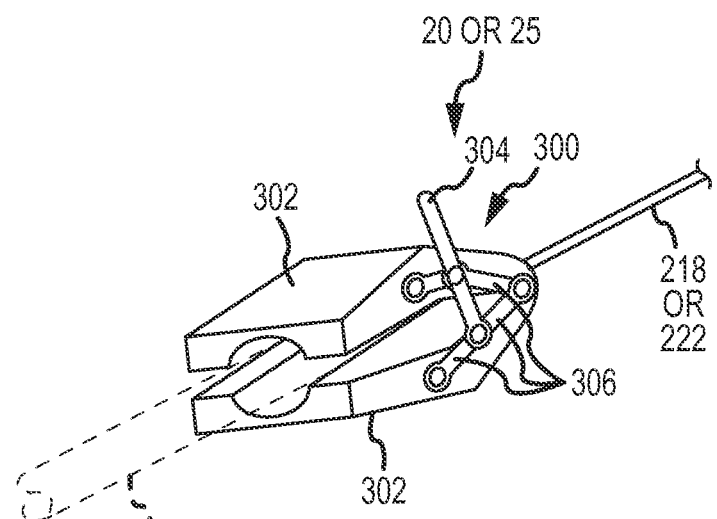
FIG. 15 is an isometric view of one embodiment of a clamping mechanism of an engagement member.

As indicated in FIG. 15, which is an isometric view of one embodiment of a clamping mechanism of an engagement member 20, 25, a clamp 300 may have opposed jaws 302 that are brought together in clamping engagement against the spoke ends 155a, 155b or adapter spokes 30, 35. The jaws are clamped together via the pivoting of a lever arm 304 acting through a linkage assembly 306 pivotally connecting the jaws and the lever arm. The lever arm may pivot over (i.e., move past) a center position of the linkage assembly such that, absent a counter force on the lever arm that causes the lever arm to return back over the center position, the clamping force will maintain the lever arm in position and the jaws clamped down on the spoke segments or adapter spokes.

Figure 16:
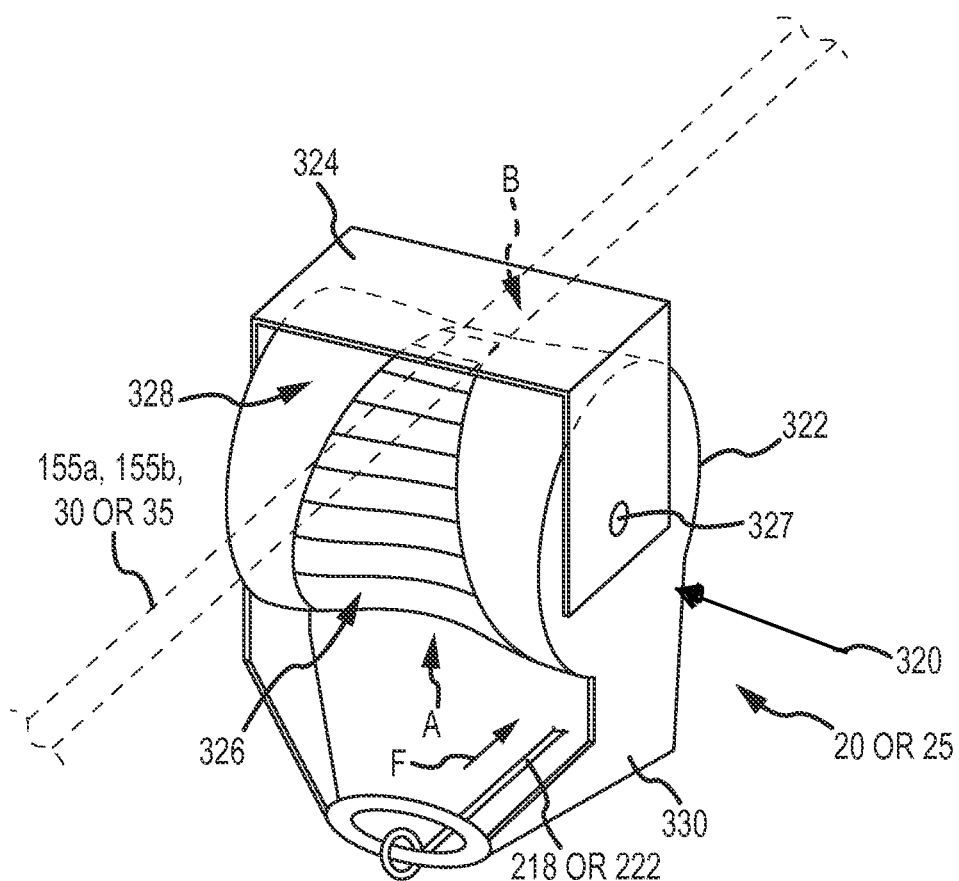
FIG. 16 is an isometric view of another embodiment of a clamping mechanism of an engagement member.

As illustrated in FIG. 16, which is an isometric view of another embodiment of a clamping mechanism of an engagement member 20, 25, a clamp 320 has jaws 322, 324 configured such that the tension force created by the engagement members being moved apart from each other causes the jaws to increasingly clamp down on the spoke segments 155a, 155b or adapter spokes 30, 35. Removal of the tension allows the jaws to release the spoke segments or adapter spokes.

As shown in FIG. 16, a cylindrical jaw 322 has an arcuate recessed region 326 formed in the outer circumferential surface of the cylindrical jaw 322. The recessed region 326 has a greatest diameter at location A and a smallest diameter at location B, the diameter of the recessed region gradually transitioning between the two locations A, B. A retainer jaw 324 is pivotally coupled to the cylindrical jaw 322 via a pivot pin 327 to extend and pivot over the outer circumferential surface of the cylindrical jaw. A spoke segment or adapter spoke is received in the space 328 between the interior of the retainer jaw 324 and the recessed region 326. The spoke segment or adapter spoke is so received with the retainer jaw initially positioned over the recessed region near the greatest diameter at location A, which is when the space 328 between the retainer jaw and the recessed region is greatest. As a tension force F is applied to a lever arm 330 extending from cylindrical jaw 322 via the rope 218 or 222 tail, the cylindrical jaw 322 is caused to rotate such that the location B of the recessed region move closer to the spoke segment or adapter spoke, eventually pinching or clamping the spoke segment 155a, 155b or adapter spoke 30, 35 between retainer jaw 324 and the narrow region of the recessed region 326 of the cylindrical jaw 322. As the tension force F increases, the clamping power between the jaws 322, 324 also increases.

Figure 17:
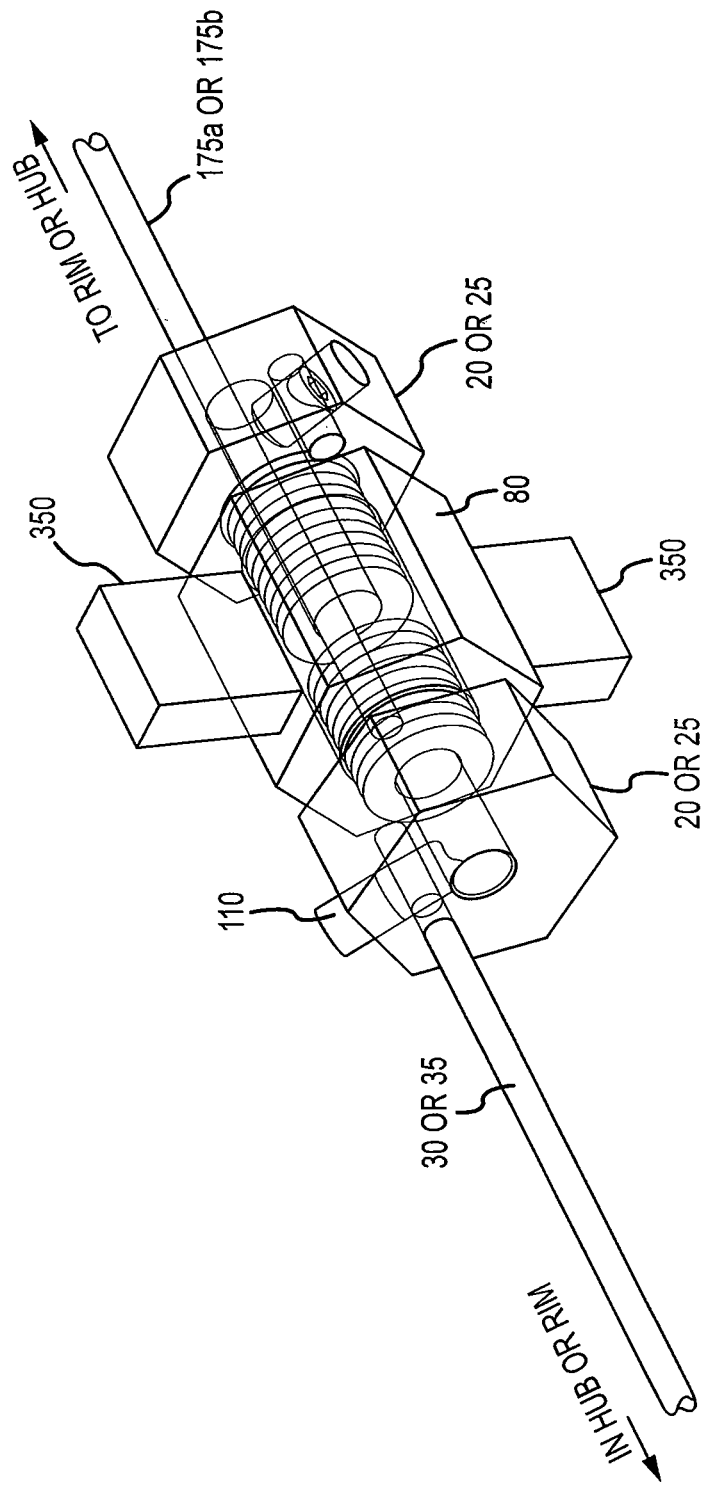
FIG. 17 is the same view as FIG. 10, except of another embodiment wherein the intermediate member includes radially extending wings.

As indicated in FIG. 17, which is the same view as FIG. 10, except of another embodiment, the intermediate member 80 may have wings 350 or other types of radially projecting members 350 that can be engaged by an operators fingers to allow a person to tighten the intermediate member 80 with the engagement members 20, 25 via finger engagement. In such an embodiment, the intermediate member 80 does not require a tool (e.g., wrench, lever, etc.) to tighten the intermediate member 80 to the engagement members 20, 25.

As indicated in FIGS. 18 and 19, which are oppositely oriented isometric views of one embodiment of the replacement universal spoke nipple 76 mentioned above with respect to FIG. 1, the replacement universal spoke nipple 76 includes a spoke receptor end 400 and a rim attachment end 405 opposite the spoke receptor end. The spoke receptor end 400 includes a threaded female bore 410 that is configured to threadably receive the threaded end 70 of the adapter rim spoke 35. The rim attachment end 405 includes one or more members 415 that are spring loaded to bias outwardly from slots 417 in a shaft 420 of the rim attachment end that extends from the spoke receptor end 400.

In one embodiment, the spring loaded members 415 are pivotally coupled to the shaft 420 via a pivot pin 425. A spring extends about the pivot pin 425 and acts against the members 415 to cause the members to bias outwardly from the shaft 420 when the free ends of the members 415 are not acted upon by a force. The members 415 may have a leading sloped surface 430 and a squared off trailing edge 435 such that the members form a wedge shape.

For a discussion of a method of employing the replacement nipple 76 of FIGS. 18-19, reference is made to FIGS. 20-22, which are a series of cross sections through the wheel rim 165 illustrating the nipple 76 being installed in a hole 440 in the rim formerly occupied by a spoke nipple 77 that has failed. As can be understood from FIG. 20, a spoke nipple 77, which was an original part of the wheel rim 165 and may have failed or had its spoke 170 fail near or within the spoke nipple, is first removed from the hole 440 by being, for example, unthreaded from the hole, pushed into the interior of the rim, pulled out of the rim, etc. As indicated by arrow R in FIG. 20, the replacement nipple 76 is moved towards the vacated hole 440 with the rim attachment end 405 leading the way.

As indicated in FIGS. 21 and 18-19, as the shaft 420 of the rim attachment end 405 passes through the hole 440, the sloped edges 430 of each respective wedge-shaped member 415 encounter the edges of the hole 440. The force exerted against the sloped edges 430 cause the members 415 to recess sufficiently within the slots 417 to allow the attachment end 405 to pass through the hole 440.

As illustrated in FIGS. 22 and 18-19, once the attachment end 405 is fully received in the hole 440 such that the trailing edges 435 of the respective members 415 clear the interior edge of the hole 440, the members 415 will bias outwardly such that the trailing edges 435 will prevent the replacement nipple 76 from being withdrawn from the hole 440. The thread end 70 of the adapter rim spoke 35 can then be threadably received in the female threaded bore 410 of the spoke receptor end 400 of the replacement nipple 76.

The kit 10 and its coupler 15 disclosed above have been discussed in the context of repairing a broken bicycle spoke. However, the kit and its coupler are also readily applicable to the repair of other linear members on bicycles or other equipment, including, for example, the emergency or field repair of a bicycle brake system cable.

Although the present invention has been described with reference to preferred embodiments, persons skilled in the art will recognize that changes may be made in form and detail without departing from the spirit and scope of the invention.

What is claimed is:

1. A bicycle wheel repair kit for joining a first segment of a spoke to a second segment of the spoke, the first segment extending radially outward from a wheel hub to terminate in a first free end and the second segment extending radially inward from a wheel rim to terminate in a second free end, the kit comprising:
a coupler comprising a first engagement member configured to engage the first free end and a second engagement member generally opposite the first engagement member and configured to engage the second free end, wherein the coupler is configured such that a distance between the first engagement member and the second engagement member can be adjusted; and
a replacement spoke nipple including: a spoke receptor end configured to threadably receive the end opposite the second free end; and a rim attachment end including at least one member configured to bias away from the rim attachment end, the replacement spoke nipple thereby being configured to facilitate the end opposite the second free end being configured to engage the rim.

2. The kit of claim 1, wherein the coupler further comprises an intermediate member between the first engagement member and the second engagement member, wherein displacement of the intermediate member relative to at least one of the first engagement member or second engagement member adjusts the distance between the first engagement member and the second engagement member.

3. The kit of claim 2, wherein the first engagement member or second engagement member is threadably engaged with the intermediate member.

4. The kit of claim 3, wherein being threadably engaged forms at least part of an arrangement responsible for adjusting the distance between the first engagement member and second engagement member.

5. The kit of claim 2, wherein the first engagement member and second engagement member engage the intermediate member by threads.

6. The kit of claim 5, wherein threads of the first engagement member have an opposite thread direction from threads of the second engagement member.

7. The kit of claim 1, wherein the coupler further comprises an intermediate member between the first engagement member and the second engagement member, wherein the intermediate member includes a threaded male shaft that is received in a threaded female bore of the first engagement member, rotation of the intermediate member relative to the first engagement member adjusting the distance between the first engagement member and the second engagement member.

8. The kit of claim 1, wherein the coupler further comprises an intermediate member between the first engagement member and the second engagement member, wherein the intermediate member includes a threaded female bore that receives a threaded male shaft of the first engagement member, rotation of the intermediate member relative to the first engagement member adjusting the distance between the first engagement member and the second engagement member.

9. The kit of claim 1, wherein the coupler further comprises an intermediate member between the first engagement member and the second engagement member, wherein the intermediate member includes a drum and a rope-like member extending between the drum and the first engagement member, rotation of the drum adjusting the distance between the first engagement member and the second engagement member.

10. The kit of claim 1, wherein decreasing the distance between the first engagement member and the second engagement member once the first engagement member is engaged with the first free end and the second engagement member is engaged with the second free end increases tension in the first segment and second segment that are joined together by the coupler.

11. The kit of claim 1, wherein the first engagement member is configured to engage the first free end by receiving the first free end in the first engagement member and mechanically engaging the first free end.

12. The kit of claim 11, wherein a setscrew of the first member forms at least part of an arrangement that allows the first engagement member to mechanically engage the first free end.

13. The kit of claim 11, wherein a clamping arrangement of the first member forms at least part of an arrangement that allows the first engagement member to mechanically engage the first free end.

14. The kit of claim 1, further comprising the first segment in the form of a replacement spoke portion having an end opposite the first free end that is configured to engage the hub.

15. The kit of claim 1, further comprising the second segment in the form of a replacement spoke portion having an end opposite the second free end that is configured to engage the rim.

16. The kit of claim 1, further comprising a pouch configured to receive therein the coupler, the first segment in the form of a replacement spoke and the second segment in the form of a replacement spoke.

17. The kit of claim 1, further comprising instructions indicating the first segment is to be engaged by the first engagement member, the second segment is to be engaged by the second engagement member, and the distance between the first engagement member and second engagement member is to be decreased to tension a spoke assembly comprising the first segment joined to the second segment by the coupler.

18. A repaired bicycle wheel comprising:
a hub, a rim offset from and circumferentially extending about the hub, and a spoke comprising: a first segment extending radially outward from the hub to terminate in a first free end; and a second segment extending radially inward from the rim to terminate in a second free end; and
a spoke repair assembly comprising a first member engaging the first free end, a second member engaging the second free end, and an intermediate member joining the first member to the second member to create a joined spoke assembly comprising the first segment, spoke repair assembly and second segment, the intermediate member being adjustable relative to the first member and the second member so as to adjust tension in the joined spoke assembly,
wherein:
a longitudinal axis of the first segment and a longitudinal axis of the second segment are axially offset in the joined spoke assembly.

19. The wheel of claim 18, wherein the first member or second member engages the intermediate member threads.

20. The wheel of claim 19, wherein the threads form at least part of an arrangement responsible for adjusting the tension in the joined spoke assembly.

21. The wheel of claim 18, wherein the first member engages the first free end by receiving the first free end in the first member and mechanically engaging the first free end.

22. The wheel of claim 21, wherein a setscrew of the first member forms at least part of an arrangement that allows the first member to mechanically engage the first free end.

23. The wheel of claim 18, wherein the first member and second member engage the intermediate member by threads.

24. The wheel of claim 23, wherein threads of the first member have an opposite thread direction from threads of the second member.

25. The wheel of claim 18, wherein the first segment is a replacement spoke portion having an end opposite the first free end that is configured to engage the hub.

26. The wheel of claim 18, wherein the second segment is a replacement spoke portion having an end opposite the second free end that is configured to engage the rim.

27. A method of repairing a bicycle wheel, the method comprising:
provide a bicycle wheel comprising a hub, a rim offset from and circumferentially extending about the hub, and a broken spoke comprising: a first segment extending radially outward from the hub to terminate in a first free end; and a second segment extending radially inward from the rim to terminate in a second free end;
provide an adapter hub spoke comprising a first end and a second end opposite the first end;
operably couple the first end of the adapter hub spoke to the hub;
connect a first spoke engagement member to the second end of the adapter hub spoke;
connect a second spoke engagement member to the second free end;
operably couple the first spoke engagement member to the second spoke engagement member with an intermediate member; and
displace at least a portion of the intermediate member to bring about a reduction in distance between the first spoke engagement member and the second spoke engagement member,
wherein:
to operably couple the first end of the adapter hub spoke to the hub includes hooking the first end into a hole in the hub formerly occupied by a portion of the first segment or hooking the first end into an intersection between at least two non-broken spokes.

28. The method of claim 27, further comprising removing the first segment from the hub.

29. A method of repairing a bicycle wheel, the method comprising:
provide a bicycle wheel comprising a hub, a rim offset from and circumferentially extending about the hub, and a broken spoke comprising: a first segment extending radially outward from the hub to terminate in a first free end; and a second segment extending radially inward from the rim to terminate in a second free end;
provide an adapter rim spoke comprising a first end and a second end opposite the first end;
operably couple the first end of the adapter rim spoke to the rim;
connect a first spoke engagement member to the second end of the adapter rim spoke;
connect a second spoke engagement member to the first free end;
operably couple the first spoke engagement member to the second spoke engagement member with an intermediate member; and
displace at least a portion of the intermediate member to bring about a reduction in distance between the first spoke engagement member and the second spoke engagement member,
wherein:
to operably couple the first end of the adapter rim spoke to the rim includes threading the first end into the rim.

30. The method of claim 29, further comprising removing the second segment from the rim.

31. The method of claim 30, wherein to operably couple the first end of the adapter rim spoke to the rim includes replacing a spoke nipple that came with the rim with a replacement spoke nipple and threading the first end into the replacement spoke nipple.

32. A method of repairing a bicycle wheel, the method comprising:
provide a bicycle wheel comprising a hub, a rim offset from and circumferentially extending about the hub, and a broken spoke comprising: a first segment extending radially outward from the hub to terminate in a first free end; and a second segment extending radially inward from the rim to terminate in a second free end;
provide an adapter rim spoke comprising a first end and a second end opposite the first end;
operably couple the first end of the adapter rim spoke to the rim;
connect a first spoke engagement member to the second end of the adapter rim spoke;
connect a second spoke engagement member to the first free end;
operably couple the first spoke engagement member to the second spoke engagement member with an intermediate member; and
displace at least a portion of the intermediate member to bring about a reduction in distance between the first spoke engagement member and the second spoke engagement member,
wherein:
to operably couple the first end of the adapter rim spoke to the rim includes replacing a spoke nipple that came with the rim with a replacement spoke nipple and threading the first end into the replacement spoke nipple.

33. The method of claim 32, further comprising removing the second segment from the rim.

\* \* \* \* \*